April 21, 1931.  A. POULSEN ET AL  1,802,065
DEVICE FOR STARTING HEAVY ROTARY BODIES ADAPTED
TO SECURE UNIFORM MOVEMENT OF FILM
Filed Dec. 18, 1928
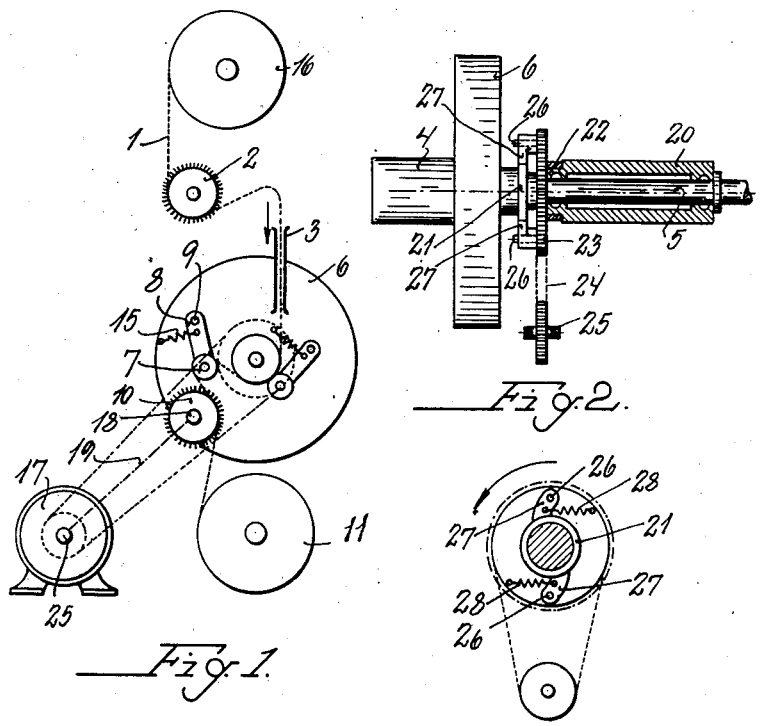
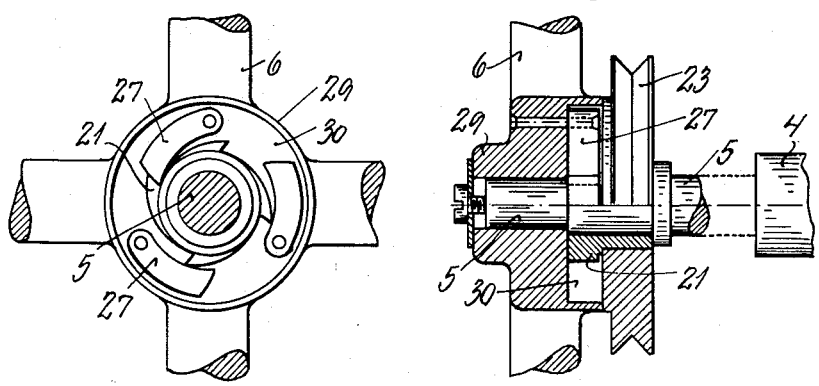
Inventors:
Arnold Poulsen
and Axel Carl Georg Petersen
By
Attorney.

Patented Apr. 21, 1931

1,802,065

UNITED STATES PATENT OFFICE

ARNOLD POULSEN, OF HELLERUP, COPENHAGEN, AND AXEL CARL GEORG PETERSEN, OF COPENHAGEN, DENMARK

DEVICE FOR STARTING HEAVY ROTARY BODIES ADAPTED TO SECURE UNIFORM MOVEMENT OF FILMS

Application filed December 18, 1928, Serial No. 326,894, and in Great Britain March 21, 1928.

For regulating the rate of speed at which a film, especially a sound-film, is fed forward in recording and reproducing apparatuses, it has formerly been proposed, as is well known, to use a fly wheel or other heavy rotary body driven by a roller over which the film is running. Regulating devices of this nature have been described for instance in British Patent No. 249,627.

At the start of apparatuses in which, as mentioned above, a heavy rotary body, for instance a fly wheel, is used for regulating the speed of the film, the entire film-moving mechanism and the film itself may relatively soon be accelerated up to the final speed; while on the other hand the fly wheel, owing to its inertia, will require considerably more time before acquiring its final velocity. The consequence is that if the fly wheel is started and accelerated solely by means of the film, then the latter will either slide on the roller which is coupled to the fly wheel and over which the film is passing, whereby the film will soon be worn, or else be exposed to very high mechanical tensile stresses which are liable to tear the film.

In order to avoid this drawback it has formerly been proposed to couple the fly wheel mechanically to the driving mechanism of the film, during the start, by means of a coupling operated by a centrifugal governor. A device of this nature complicates the apparatus very considerably and does not provide a sufficiently reliable coupling between fly wheel and driving mechanism during the start.

According to the present invention a very simple and reliably acting automatic coupling is effected between the fly wheel and the driving mechanism serving to start the same (which driving mechanism preferably, although not necessarily, may be the driving mechanism serving to move the film) by means of a free-wheel device by which the fly wheel is accelerated up to a speed slightly inferior to the speed at which the fly wheel is to be driven by the film. For that reason the film, after the fly wheel has been accelerated by means of the free-wheel device, will further accelerate the fly wheel and, thereby, release the free-wheel device, so that the previously established coupling of the driving mechanism to the fly wheel is released, whereafter the rotation of the fly wheel is maintained by the film.

The drawing shows various constructions of the present invention.

Fig. 1 shows, diagrammatically, in side elevation a regulator of known construction adapted to regulate the speed of motion of a sound-film in a sound-recording or sound-reproducing apparatus, Fig. 2 a construction of the improved regulator, in side elevation, Fig. 3 a detail of Fig. 2 in end view, Fig. 4 a modified construction of the regulator, in side elevation, partly sectional, Fig. 5 a detail of Fig. 4, in end view.

In Fig. 1, 1 is a film passing from a magazine 16 over a guiding roll 2 and thence through a so-called gate 3 or the like to a roller 4 disposed on the same shaft 5 as a fly wheel 6, or directly connected to the latter. From the roller 4 the film passes loop-like over a roller 7 which is journalled at the end of an arm 8 pivoted about a fixed pin 9 and maintained, by means of a spring 15, in contact with the part of the film leaving the roller 4, in such a manner that said film will be held stretched in a bight between the roller 4 and a film-feeding roller 10 by way of which the film passes from the roller 7 to a magazine 11 in which it is coiled around a film spool in known manner.

The rollers 2 and 10 are driven in suitable known manner by means of a mechanical or electrical driving device; for instance, as shown, by means of an electric motor 17 coupled to the shaft 18 of the feeding roller 10 by means of a suitable transmission device 19 which may be a gear-wheel drive, a belt drive, a cord drive, a chain drive or the like. The rollers 2 and 10 are formed as film-conveyors of known construction with radially disposed teeth engaging two rows of holes in the film, but they may be replaced by film-feeders of any other suitable construction adapted to move the film continuously. The fly wheel 6 is maintained in rotation by the pull exerted on the roller 4 by the film 1.

According to the present invention the starting of the fly wheel is effected by a free-wheel device maintaining, during the starting operation, the fly wheel coupled to the driving mechanism of the apparatus. One construction of such a device is shown in Figs. 2 and 3. In this construction, the fly wheel 6 is attached to the shaft 5 on which the roller 4 is attached co-axially with the fly wheel 6. The shaft 5 is journalled in a bearing 20 in the reproducing or recording apparatus, and a circular disc 21 is attached to the hub of the fly wheel or to the shaft 5. On a neck 22 on the bearing 20 there is journalled a wheel 23 which, in the construction shown in Figs. 2 and 3, is a sprocket wheel adapted to be driven, by means of a chain 24 for instance, from the shaft 25 of the motor 17, Figs. 1 and 3. Instead of being a sprocket wheel, the wheel 23 may be a gear wheel, a cord pulley or the like driven in any suitable manner from shaft 25. On the wheel 23 two friction pawls 27 are pivoted about pins 26, the said pawls being forced towards the disc 21 by means of springs 28, so that their ends engage the periphery of said disc, whereby a friction between the latter and the pawls is produced which is sufficient, during the starting of the apparatus, to cause the fly wheel 6 and the shaft 5 to partake of the rotation imparted to the wheel 23 by the driving mechanism. The ratio of gearing between the driving mechanism and the wheel 23 is determined in such a manner that the maximum rotary speed imparted by the wheel 23 to the fly wheel 6 during starting will be slightly lower than the final speed at which the fly wheel is caused to be driven by the film running over the roller 4.

The film will accelerate the fly wheel after the latter has attained the maximum speed imparted to it by the wheel 23; and by reason of this further acceleration the disc 21 will be rotated relatively to the wheel 23 in the direction indicated by the arrow in Fig. 3, whereby the pawls 27 will swing away from said disc about the pins 26 while overcoming the tension of the springs 28. Hence, the mechanical coupling between the fly wheel and the wheel 23 is released, and the fly wheel is then maintained in rotation solely by means of the film, which latter drives the roller 4 and the fly wheel coupled thereto at a rotary speed which is higher than the rotary speed at which the wheel is driven by the driving mechanism. During normal operation of the apparatus the periphery of disc 21 will slide past the ends of the pawls 27, without the thereby produced friction appreciably retarding the motion of the fly wheel.

If it is desired to avoid the friction between the pawls 27 and the periphery of the disc 21 the free-wheel mechanism may be constructed for instance in the manner shown in Figs. 4 and 5, in which the pawls 27 are formed like ratchet pawls disposed within an axial circular recess 30 in the hub 29 of the fly wheel 6. In this construction the disc 21 is connected to the wheel 23, which then takes the form of a grooved pulley, said disc being shaped like a ratchet wheel disposed in the said recess 30 in the hub 29, inside of the pawls provided there. The wheel 23 and the ratchet-wheel disc 21 connected thereto are loose on the fly-wheel shaft 5.

In the construction shown in Figs. 4 and 5 three ratchet pawls 27 are distributed symmetrically about the fly-wheel axis, by which arrangement the advantage is secured that when the fly wheel is at a standstill one of the pawls 27, owing to its weight, will always be in contact with one of the teeth on the periphery of the disc 21. In consequence, when the driving mechanism of the apparatus, which is coupled to the wheel 23, for instance by means of a cord drive or chain drive or gear wheels, is started, one of the teeth on the periphery of the disc 21 will take one of the pawls 27 along and, hence, cause the fly wheel to rotate with wheel 23. When the wheel 23 has reached its maximum number of revolutions, which is lower than the final number of revolutions of the roller 4 over which the film is running, then the film will further accelerate the fly wheel, whereby the latter rotates forward in the direction of revolution, relatively to the disc or ratchet wheel 21, in such a manner that the pawl 27 which previously was in contact with one of the teeth of the ratchet wheel 21 will now be released from the latter and, owing to centrifugal force, will swing out against the outer wall of the recess 30. All the pawls 27 remain in contact with the said outer wall as long as the fly wheel is driven by the film and rotates at a speed exceeding a certain lower limit where gravity acting one one of the pawls will be sufficient to move the same into engagement with the teeth of the ratchet disc 21.

Instead of the above described free-wheel mechanism in which the coupling is effected by means of friction or ratchet-pawls, other free-wheel devices of any suitable construction may be used, the coupling between the part of the free-wheel device connected to the fly wheel and the part connected to the driving mechanism being effected in known manner by means of rollers or rolls which, by friction against the disc 21, take the fly wheel along when the wheel 23 is moved in the other direction, but automatically release the coupling when the roller 4 and, hence, the fly wheel, are driven by the film. Free-wheel devices of this construction are commonly known, for instance in bicycles and the like.

Having now particularly described and ascertained the nature of our said invention and in what manner the same is to be performed, we declare that what we claim is:—

1. A constant-speed film-feeding apparatus, comprising a driving mechanism; a feeding roller rotated continuously thereby; a fly-wheel; a roller coupled to the fly-wheel and driven by the passage of the film thereover; and means other than the film itself for coupling the fly-wheel to the driving mechanism during starting and for releasing the said coupling automatically when the fly-wheel has attained a speed slightly less than the speed at which the fly-wheel is to be driven by the film.

2. A constant-speed film-feeding apparatus, comprising a driving mechanism; a feeding roller rotated continuously thereby; a fly-wheel; a roller coupled to the fly-wheel and driven by the passage of the film thereover; and an overrunning clutch coupling the fly-wheel to the driving mechanism during starting and automatically releasing it from said mechanism when the fly-wheel has attained a speed slightly less than the speed at which the fly-wheel is to be driven by the film.

3. A constant-speed film-feeding apparatus, comprising a driving mechanism; a feeding roller rotated continuously thereby; a flywheel; a roller coupled to the fly-wheel and driven by the passage of the film thereover; a wheel coupled to the driving mechanism and loosely mounted on the shaft of the fly-wheel; and means for coupling the second-named wheel automatically to the fly-wheel when the former tends to rotate at a higher speed than the fly-wheel, and for releasing the fly-wheel automatically from said second-named wheel when the fly-wheel is accelerated relatively to the said second-named wheel by the roller driven by the film.

4. Film-feeding apparatus according to claim 2, in which the overrunning clutch comprises a driven member disposed co-axially with the fly-wheel, and a pawl device consisting of a ratchet wheel co-axial with the said driven member and a plurality of pawls arranged at spaced intervals about the axis of said ratchet wheel so that one of said pawls will always be caused by gravity to engage the ratchet wheel when the pawl device and the fly-wheel are at standstill.

In testimony whereof they affix their signatures.

AXEL CARL GEORG PETERSEN.
ARNOLD POULSEN.